(12) United States Patent
Suzuki (10) Patent No.: US 6,516,400 B1
(45) Date of Patent: Feb. 4, 2003

(54) DATA STORAGE, DATA PROCESSING SYSTEM AND METHOD

(75) Inventor: Kaoru Suzuki, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/334,667

(22) Filed: Jun. 17, 1999

(30) Foreign Application Priority Data

Jun. 30, 1998 (JP) .......................................... 10-185256

(51) Int. Cl.[7] .............................................. G06F 12/00
(52) U.S. Cl. ........................ 711/209; 711/205; 711/206
(58) Field of Search ................................ 711/103, 202, 711/205, 206, 207, 208, 209

(56) References Cited

U.S. PATENT DOCUMENTS

| | | | | |
|---|---|---|---|---|
| 5,682,495 A | * | 10/1997 | Beavers et al. ............. | 711/205 |
| 5,742,934 A | * | 4/1998 | Shinohara ................... | 711/103 |
| 6,112,285 A | * | 8/2000 | Ganapathy et al. ......... | 711/207 |
| 6,125,433 A | * | 9/2000 | Hortsmann et al. ......... | 711/160 |
| 6,144,607 A | * | 11/2000 | Sassa ......................... | 711/103 |

* cited by examiner

Primary Examiner—Matthew Kim
Assistant Examiner—Christian P. Chace
(74) Attorney, Agent, or Firm—Sonnenschein, Nath & Rosenthal (57) ABSTRACT

When reading or writing data from or to a flash memory, a table indicating the correspondence between physical addresses of physical blocks composing together a storage area of the flash memory and logical addresses of logical blocks written in the physical blocks, is generated in segments of the flash memory.

34 Claims, 8 Drawing Sheets

| PHYSICAL ADDRESS | LOGICAL ADDRESS |
|---|---|
| 0 | 2 |
| 1 | 3 |
| 2 | 4 |
| 3 | 10 |
| 4 | 5 |
| 5 | UNUSED |
| ⋮ | ⋮ |
| n | s |

DATA STORAGE, DATA PROCESSING SYSTEM AND METHOD

RELATED APPLICATION DATA

The present application claims priority to Japanese Application No. P10-185256 filed Jun. 30, 1998, which application is incorporated herein by reference to the extent permitted by law.

BACKGROUND OF THE INVENTION

1. Field of the Invention

The present invention relates to a data storage comprising a storage means having a data storage area divided in a plurality of blocks and in which data written in the data storage area are managed in blocks, and a data processing system for and method of writing or reading data to and/or from the data storage.

2. Description of Related Art

A card type external data storage (will be referred to as "memory card" hereinunder) has so far been proposed which employs a flash memory (a type of nonvolatile memory, similar to EEPROM (electrically erasable programmable read-only memory)) as an external data storage which is used in electronic devices such as computers, etc.

In the memory card, the flash memory as a data storage has a data storage area divided into a plurality of blocks, and data written in the flash memory are managed in blocks.

In the flash memory, if data are written to the blocks with different frequencies from one to another block, the blocks to which data are written with high frequency are likely to be faulty. To avoid this, it is necessary to write data to all the blocks with a generally same frequency while writing no data to faulty blocks.

To meet the above requirement, the data processing system using a memory card provided with a flash memory as a data storage means is adapted such that data to be stored into the flash memory is divided into a plurality of blocks, address information is added to each of the blocks and the data blocks are written to the blocks of the flash memory to which data have been written with lower frequencies. It should be noted that in the following description, blocks resulted from division of the data storage area of the flash memory will be referred to as "physical blocks" while those resulted from division of data will be referred to as "logical blocks", in order to avoid confusion between the storage area blocks and data blocks. Also the addresses of the physical blocks will be referred to as "physical address" while those of the logical blocks will be referred to as "logical address".

To read data from the memory card, access is made first to all the physical blocks of the flash memory, and a table indicating the correspondence between the physical addresses of the physical blocks and logical addresses of the logical blocks stored in the physical blocks is generated in an internal memory of a data processing circuit. Reference is made to this table to detect the physical address of a physical block at which a desired data is stored and then read the desired data from the physical block.

Also, to write data to the memory card, access is made first to all the physical blocks of the flash memory and a table indicating the correspondence between the physical addresses of the physical blocks and the logical addresses of the logical addresses stored in the physical blocks is generated in the internal memory of the data processing circuit. Then, reference is made to the table to detect a physical block which is unused and write a desired data to the unused physical block.

Recently, it has been required more and more for the electronic devices such as computers, etc. to have a higher capability of data processing and process a huge amount of data at a time. In these circumstances, the external data storage used in association with such an electronic device should also have a larger capacity. Also, since a flash memory has been proposed which has a greatly improved degree of integration, an improved memory card has been proposed which has a capacity as large as 128 MB, for example.

The memory card of such a large capacity uses a flash memory having a large number of physical blocks. Therefore, in the large-capacity memory card, the tables generated at each time of data write and read are also large, which necessitates a data processing circuit having a large-capacity internal memory. These requirements have caused to increase the manufacturing cost of the memory card.

SUMMARY OF THE INVENTION

Accordingly, the present invention has an object to overcome the above-mentioned drawbacks of the prior art by providing an inexpensive data storage adapted to have an enlarged storage capacity and permit a high efficiency of data write or read, a data processing system and method both using the data storage.

The above object can be attained by providing a data storage for connection to an external device, comprising according to the present invention:
- a storage means having a storage area divided in a plurality of blocks each having an absolute address peculiar thereto; and
- a control means for writing or reading data to or from the storage means based on a command from the external device;
- the control means incorporating a conversion table by which a relative address of a data to which the command from the external device is directed is converted to the absolute address.

Also the above object can be attained by providing a data processing system including a data processing apparatus connected to a data storage comprising a storage means having a storage area divided in a plurality of blocks each having an absolute address peculiar thereto; the data processing apparatus comprising according to the present invention:
- means for issuing a command to the storage means to write or read data;
- the control means incorporating a conversion table by which a relative address of a data to which the command from the external device is directed is converted to the absolute address.

Further the above object can be attained by providing a data processing method of writing or reading data to or from a storage means having a storage area divided in a plurality of blocks each having an absolute address peculiar thereto; the method comprising, according to the present invention, the steps of:
- generating a conversion table by which a relative address of a data to be written to or read from the storage means to the absolute address; and
- referring to the conversion table to write or read the data.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
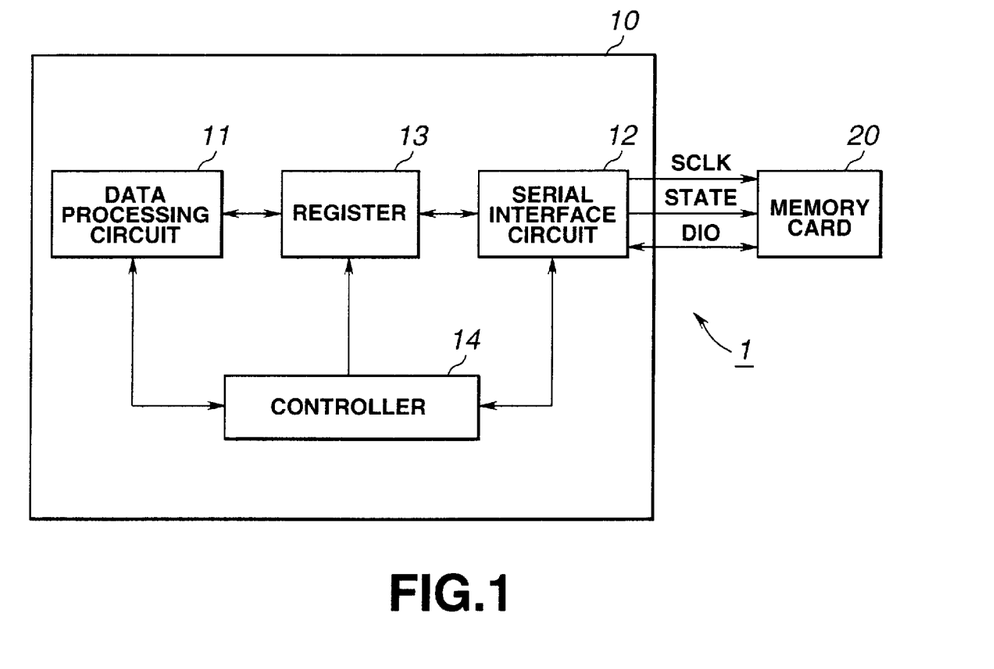
FIG. 1 is a schematic block diagram of the data processing apparatus used in the data processing system according to the present invention.

Referring now to FIG. 1, a data processing system according to the present invention is illustrated in the form of a schematic block diagram. The data processing system is generally indicated with a reference numeral 1, and comprises a data processing apparatus 10 as a host apparatus, and a memory card 20 as an external data storage connected to the data processing apparatus 10 via a serial interface.

Data transfer between the data processing apparatus 10 and memory card 20 via the serial interface will be described by way of example herein. It should be noted however that the present invention is also applicable to a system in which data transfer is done via a parallel interface.

Data Processing Apparatus 10

The data processing apparatus 10 included in the data processing system 1 according to the present invention comprises a data processing circuit 11 to run a predetermined program based on an application data, a serial interface circuit 12 to transfer the application data between the data processing apparatus 10 and the memory card 20 which is an external device, a register 13 provided between the data processing circuit 11 and serial interface circuit 12 to temporarily store the application data supplied from the data processing circuit 11, and a controller 14 connected to each of the data processing circuit 11, serial interface circuit 12 and register 13 to control the operations of these components 11, 12 and 13.

In the data processing apparatus 10, when it is judged that an application data should be stored into the memory card 20 as an external device in order for the data processing circuit 11 to run a predetermined program, the data processing circuit 11 writes the application data and a control data such as a write command or the like to the register 13 under the control of the controller 14.

Then, under the control of the controller 14, the serial interface circuit 12 reads the application data and control data from the register 13, converts them to serial data, and transfers them along with a clock signal and status signal to the memory card 20. Also, when it is judged in the data processing apparatus 10 that an application data should be read from the memory card 20 as an external device in order for the data processing circuit 11 to run a predetermined program, the data processing circuit 11 writes a control data such as a read command or the like to the register 13 under the control of the controller 14. Then, under the control of the controller 14, the serial interface circuit 12 reads the control data from the register 13, converts it to a serial data, and transfers it along with a clock signal and status signal to the memory card 20.

The application data having been transferred from the memory card 20 to the data processing apparatus 10 according to the control data is converted to a parallel data by the serial interface circuit 12. Then the data processing circuit 11 reads the application data from the register 13 and processes it in a predetermined manner under the control of the controller 14.

The data processing apparatus 10 used in the data processing system 1 according to the present invention is not limited to any special one but it may be a one which would be able to transfer data between itself and an external device such as the memory card 20, including a personal computer, digital still camera, digital video camera or the like.

In the data processing system 1, the data processing apparatus 10 and memory card 20 are connected to each other via the serial interface circuit 12, more particularly, by means of at least three data lines SCLK, State and DIO. The first data line SCLK is provided to transmit a clock signal for data transfer, the second data line State is to transmit a status signal necessary for the data transfer, and the third data line DIO is to serially transmit an application data and control data to be written to the memory card 20 or an application data and control data to be read from the memory card 20. The application data and control data are transferred between the data processing apparatus 10 and memory card 20 via these data lines.

Memory Card 20

Figure 2:
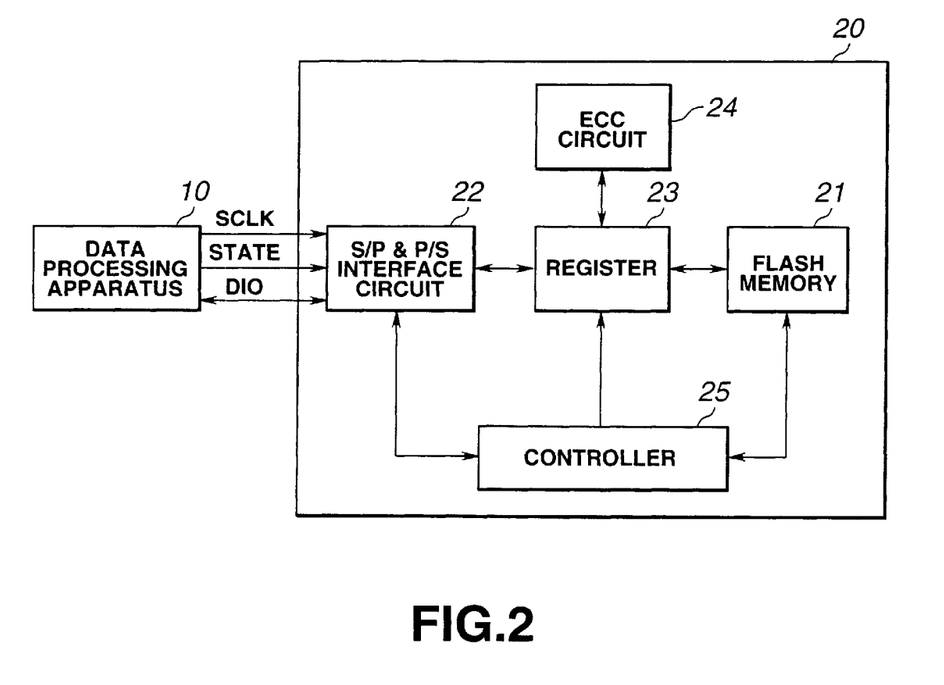
FIG. 2 is a schematic block diagram of the memory card used in the data processing system in FIG. 1.

As shown in FIG. 2, the memory card 20 comprises a flash memory 21 as a storage means, a serial/parallel and parallel/serial interface circuit (will be referred to as "S/P & P/S interface circuit" hereinunder) 22 to transfer an application data and control data between the memory card 20 and data processing apparatus 10, a register 23 provided between the flash memory 21 and S/P & P/S interface circuit 22 to temporarily store the application data supplied from the S/P & P/S interface circuit 22, an ECC circuit 24 connected to the register 23 to correct an error, if any, in the application data written in the register 23 based on an error correction code, and a controller 25 connected to each of the flash memory 21, S/P & P/S interface circuit 22 and register 23 to control the operations of these components 21, 22 and 23.

The S/P & P/S interface circuit 22 is connected via at least the above-mentioned three data lines SCLK, State and DIO to the serial interface circuit 12 of the data processing apparatus 10 to transfer an application data and control data between the memory card 20 and data processing apparatus 10. More specifically, the S/P & P/S interface circuit 22 converts a serial data transmitted from the serial interface circuit 12 of the data processing apparatus 10 to a parallel data and writes it to the register 23. Also, the S/P & P/S interface circuit 22 converts the parallel data read from the register 23 to a serial data and transmits it to the serial interface circuit 12 of the data processing apparatus 10.

A serial data is transferred between the S/P & P/S interface circuit 22 and data processing apparatus 10 over the third data line DIO while being synchronized with a clock signal transmitted from the data processing apparatus 10 over the first data line SCLK. At this time, the kind of a serial data transferred over the third data line DIO is classified based on a status signal transmitted over the second data line State. The kinds of serial data include, for example, an application data to be stored into the flash memory 21, application data to be read from the flash memory 21, and control data such as write command, read command, etc.

When a data transmitted from the data processing apparatus 10 is a control data such as a write command or read command, the S/P & P/S interface circuit 22 supplies the data to the controller 25.

As aforementioned, the register 23 temporarily stores an application data transferred between the flash memory 21 and S/P & P/S interface circuit 22.

The ECC circuit 24 adds an error correction code to an application data stored into the register 23 by the S/P & P/S interface circuit 22. In addition, the ECC circuit 24 corrects an error, if any, in an application data read from the flash memory 21 and written to the register 23.

The controller 25 controls the operation of the memory card 20 based on a control data supplied from the S/P & P/S interface circuit 22. That is, based on a write command supplied from the S/P & P/S interface circuit 22, the controller 25 reads out an application data temporarily written in the register 23 and stores it into the flash memory 21. Further, based on a read command supplied from the S/P & P/S interface circuit 22, the controller 25 reads the application data from the flash memory 21 and writes it to the register 23.

When an application data to be stored and a write command are transmitted from the data processing apparatus 10 to the memory card 20 constructed as having been described in the above, first the S/P & P/S interface circuit 22 converts the data to parallel data and supplies the write command to the controller 25, and then writes the application data to the register 23, under the control of the controller 25.

Here, the ECC circuit 24 adds an error correction code to the application data written in the register 23.

Then, based on the write command supplied from the S/P & P/S interface circuit 22, the controller 25 reads the application data from the register 23 and writes it to the flash memory 21.

In the memory card 20, when a read command is received from the data processing apparatus 10, the S/P & P/S interface circuit 22 supplies the read command to the controller 25.

Then, based on the read command supplied from the S/P & P/S interface circuit 22, the controller 25 reads the application data from the flash memory 21 and writes it to the register 23. If the application data written in the register 23 involves an error, the ECC circuit 24 connected to the register 23 corrects the error based on the error correction code.

Then under the control of the controller 25, the S/P & P/S interface circuit 22 reads the application data from the register 23, converts it to a serial data and transmits it to the data processing apparatus 10.

The data processing system 1 having the ECC circuit 24 provided in the memory card 20 to correct an error, if any, in an application data at the memory card 20, has been described in the foregoing. However, it should be noted that the ECC circuit 24 may be provided in the data processing apparatus 10 to correct an error, if any, in an application data at the data processing apparatus 10. In this case, an application data to which an error correction code is added will be transferred between the data processing apparatus 10 and memory card 20.

Application Data Configuration, and Flash Memory Construction

Figure 3:
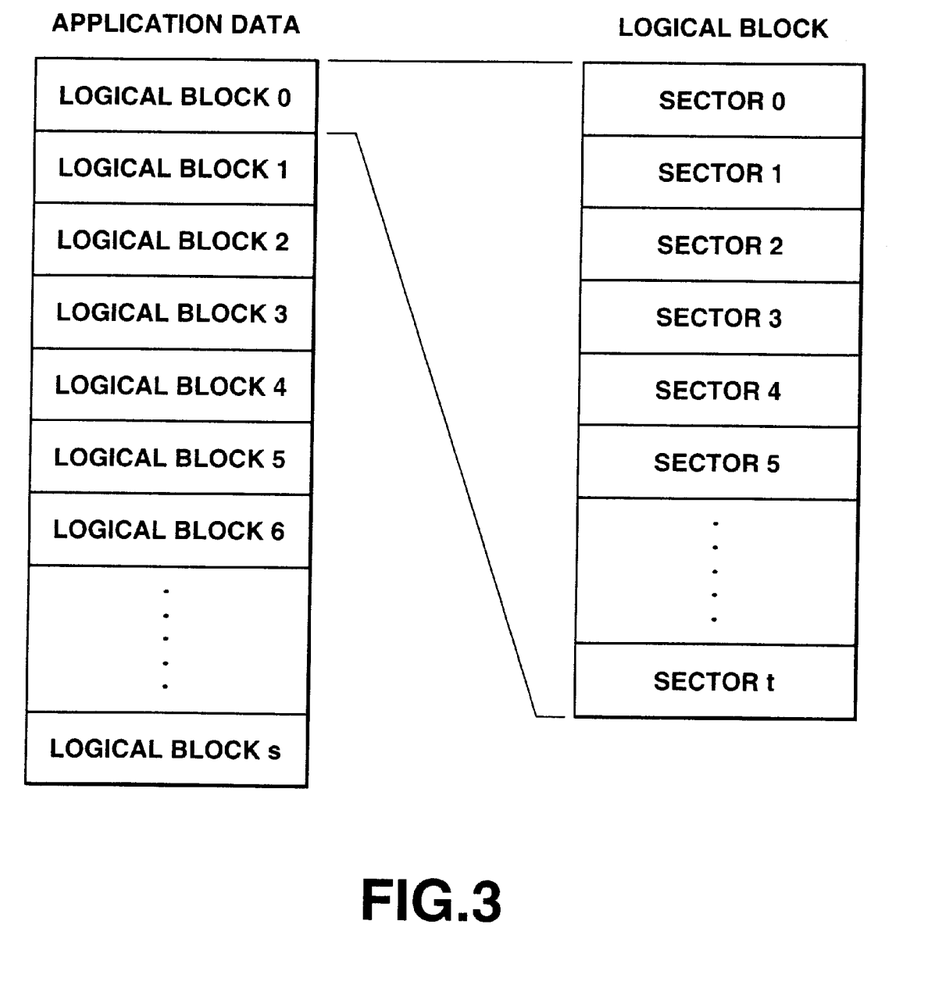
FIG. 3 schematically illustrates the configuration of an application data used in the data processing system in FIG. 1.

In the data processing system 1, an application data for running a predetermined program is divided into a plurality of logical blocks each being a data erasing unit as shown in FIG. 3. The application data is managed in logical block in the memory card 20. A logical address is assigned to each of the logical blocks composing together the application data. Each logical address is expressed by a logical number which is handled as a data.

When the application data is stored into the flash memory 21 of the memory card 20, the logical blocks will not always be stored into the flash memory 21 in the order of their logical addresses. However, when the application data is read out of the flash memory 21, the logical blocks will be rearranged in the order of the logical addresses to reconstruct the original application data.

Each of the logical blocks forming together the application data is composed of a plurality of sectors each being a write or read unit. Each of the sectors is divided into an actual data of 512 bytes and a redundant data of 16 bytes, for example. The logical addresses of logical blocks are dispersed as such redundant data in the plurality of sectors. Each of the sectors is assigned a sector number peculiar thereto, based on which the sector can be accessed.

Figure 4:
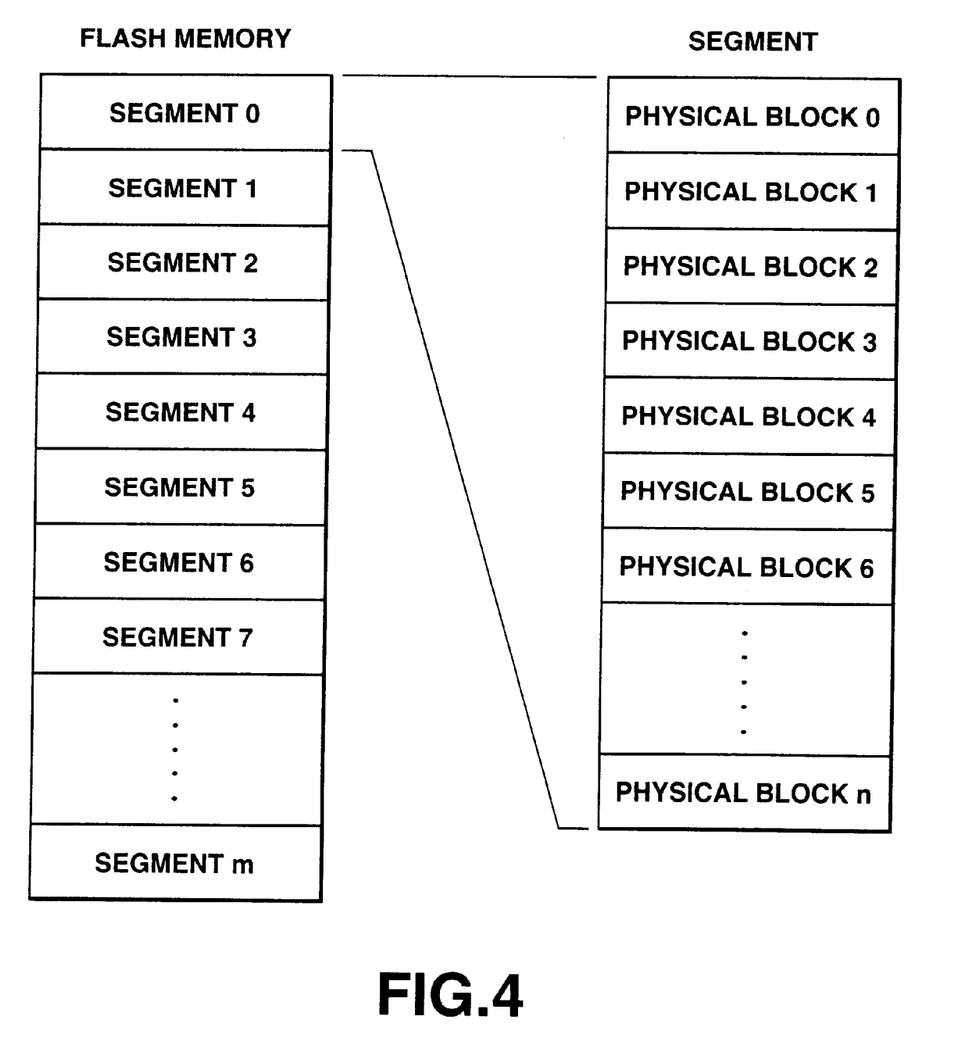
FIG. 4 schematically illustrates the configuration of a flash memory used in the data processing system in FIG. 1.

The flash memory 21 has a storage area consisting of a plurality of segments each divided into a plurality of physical blocks as shown in FIG. 4. Data stored in the flash memory 21 is managed in physical blocks and one logical block of an application data is stored in one physical block.

As mentioned above, each segment of the flash memory 21 is divided in a plurality of physical blocks. When data is read from or written to the flash memory 21, a table indicating a correspondence between the physical addresses of physical blocks of the flash memory 21 and logical addresses of logical blocks of an application data is generated in segments of the flash memory 21.

It should be noted that these segments and the physical blocks in each of the physical blocks composing each of the segments are related to each other beforehand. More specifically, concerning a segment 0 composed of physical blocks having addresses 0 to n, for example, only logical blocks having their respective logical Nos. 0 to s are stored into the segment 0 but logical blocks having a logical No. s+1 and subsequent Nos. will not. The logical blocks of the logical Nos. 0 to s will be stored inconsecutively into the physical blocks of the physical addresses 0 to n in the segment 0.

Data Read

An example of data read from the flash memory 21 of the memory card 20 in the data processing system 1 having been described in the foregoing will be described herebelow:

For reading data from the flash memory 21, a read command is transmitted from the data processing circuit 11 in the data processing apparatus 10 to the controller 25 in the memory card 20 via the serial interface circuit 12 and S/P & P/S interface circuit 22.

Figure 5:
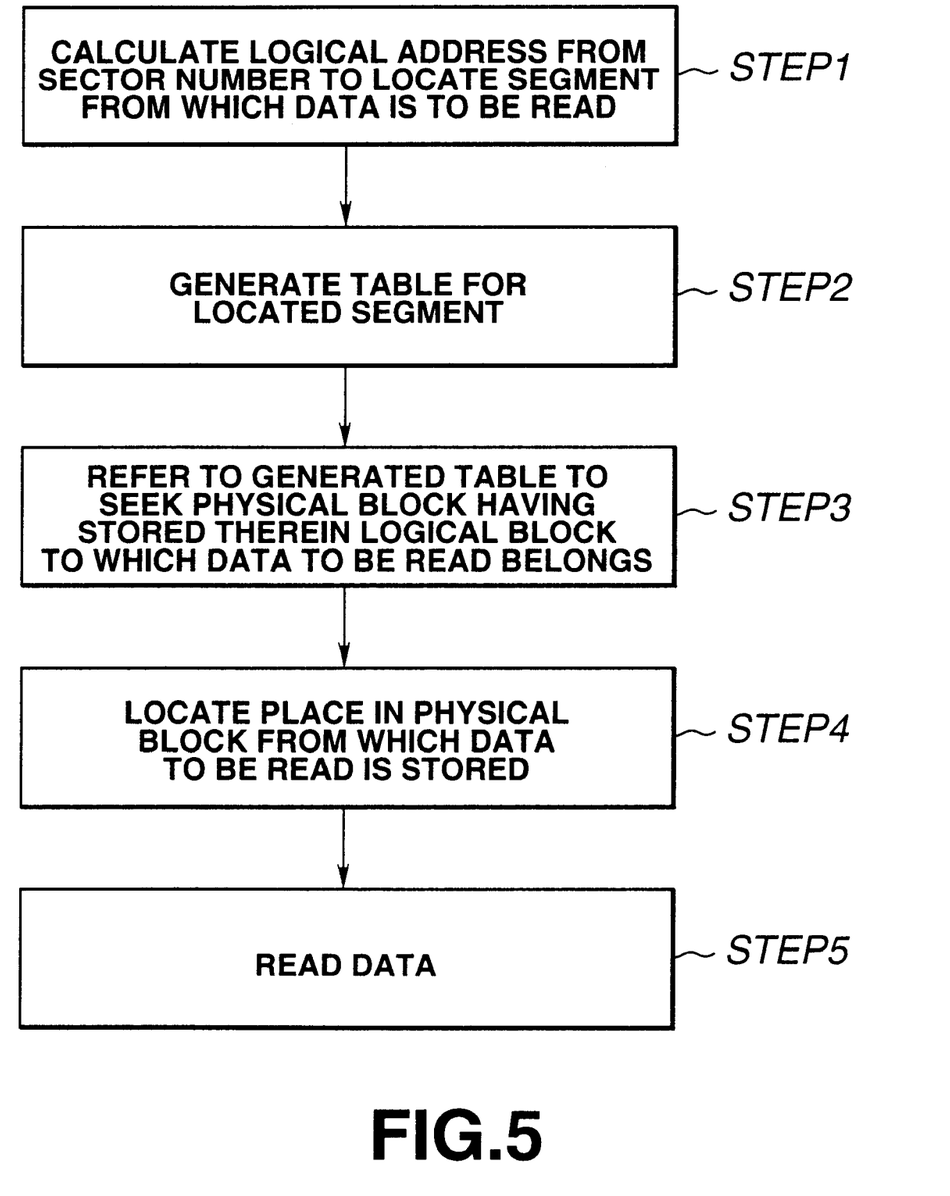
FIG. 5 is a flow chart of the operations in an example of data read from the flash memory.

Based on the read command, the controller 25 of the memory card 20 follows a procedure specified by the flow chart in FIG. 5 to read a desired data from the flash memory 21.

More particularly, first at STEP 1, the controller 25 calculates, from the sector number of a data to be read, a logical address of a logical block to which the data belongs. For example, if a logical block is divided in a number (t+1) of sectors, an logical address of a logical block to which a sector whose sector number is 100 belongs is determined by calculating 100/(t+1).

As having previously been described, there is predetermined a correspondence between segments of the flash memory 21 and logical blocks stored in physical blocks composing each of the segments. Therefore, when a logical address of a logical block to which a data to be read belongs is determined, it is known in which of the segments of the flash memory 21 the data is stored.

Figure 6:
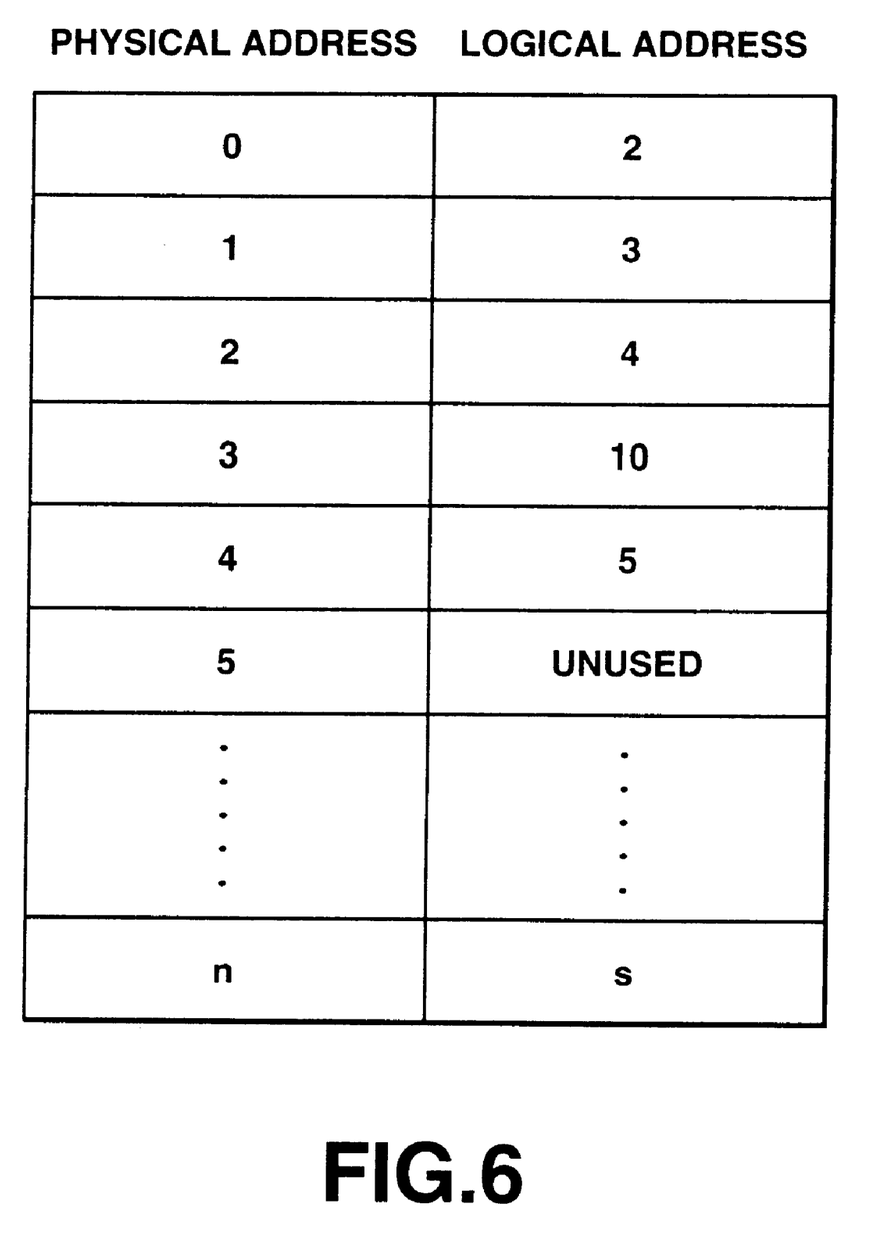
FIG. 6 schematically illustrates a table showing the correspondence between physical addresses and logical addresses.

Next at STEP 2, the controller 25 generates in an internal memory thereof a table showing a correspondence between the physical addresses of the physical blocks composing the segment in which the data is stored and the logical addresses of the logical blocks stored in the physical blocks, as shown in FIG. 6. At this time, if such a table has been generated for any other segment in the internal memory, the controller 25 will rewrite the existent table to a one for the segment in which the data to be read is stored.

Then at STEP 3, the controller 25 refers to the table thus generated to seek a physical block in which a logical block to which the data to be read belongs is stored.

Further at STEP 4, the controller 25 seeks a place within the physical block at which the data to be read is stored. In the physical block, data are stored in the order of sector numbers. Therefore, for example, if a logical block is divided in a number (t+1) of sectors, a place where a data whose sector number is 100 is stored within the logical block is determined by calculating 100−B×(t+1) (where B is the logical address of the logical block to which the data belongs).

Next at STEP 5, the controller 25 accesses to the place where the data to be read is stored within the physical block, and reads the desired data from the physical block in consideration.

As in the above, the controller 25 writes the data thus read from the flash memory 21 to the register 23. If the data thus written in the register 23 involves any error, it is subjected to error correction in the ECC circuit 24 connected to the register 23 based on the error correction code.

The data thus corrected is transmitted to the data processing circuit 11 in the data processing apparatus 10 via the S/P & P/S interface circuit 22 and serial interface circuit 12.

Data Write

Data is written to the flash memory 21 of the memory card 20 in the data processing system 1 as will be described by way of example herebelow:

To write data to the flash memory 21, first a write command is transmitted from the data processing circuit 11 of the data processing apparatus 10 to the controller 25 in the memory card 20 via the serial interface circuit 12 and S/P & P/S interface circuit 22, and a data is written to the register 23 of the memory card 20 via the serial interface circuit 12 and S/P & P/S interface circuit 22.

Figure 7:
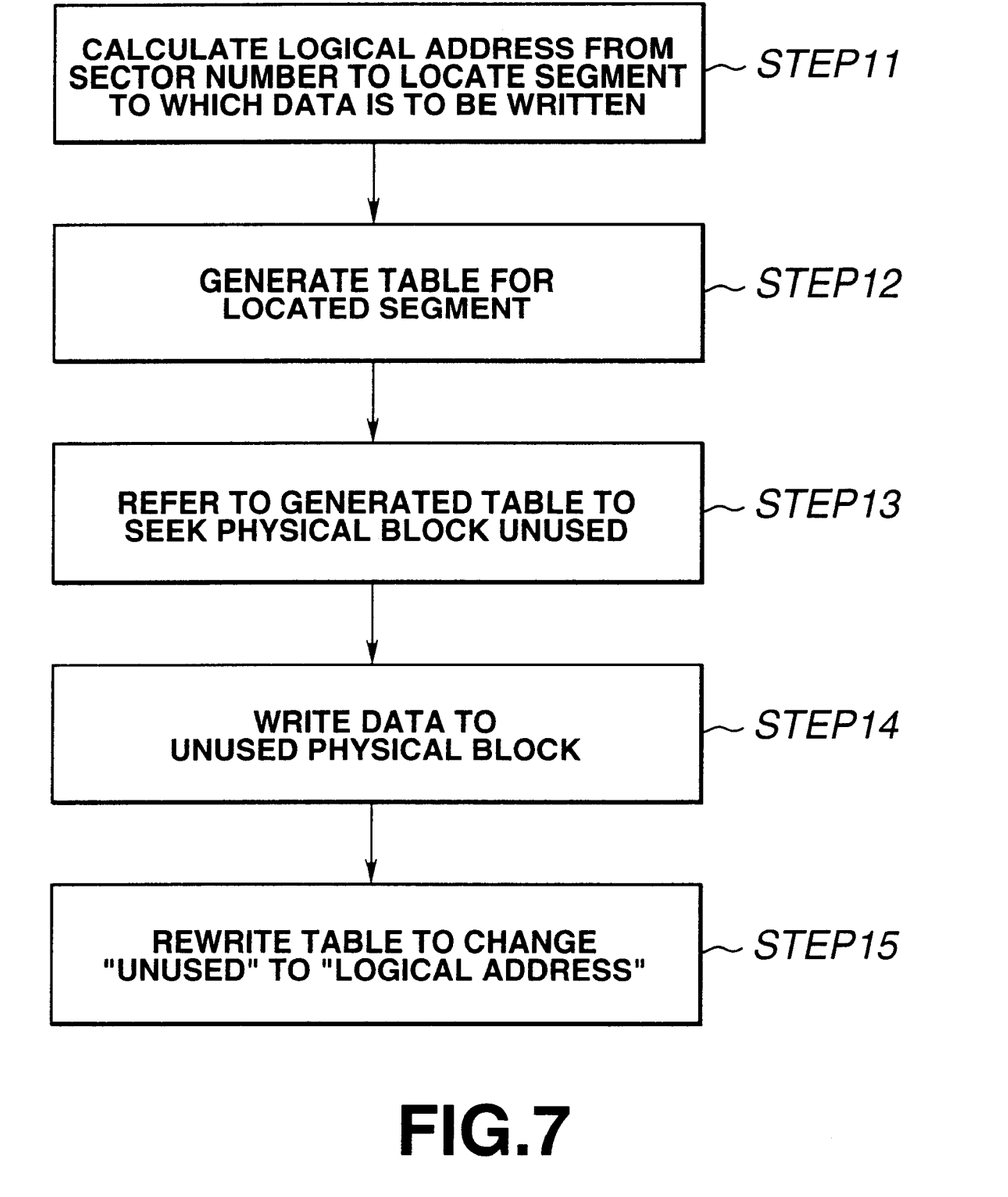
FIG. 7 is a flow chart of the operations in an example of data write to the flash memory.

Based on the write command, the controller 25 of the memory card 20 follows a procedure specified by the flow chart in FIG. 7 to write a desired data to the flash memory 21.

More particularly, first at STEP 11, the controller 25 calculates, from the sector number of a data to be written, a logical address of a logical block to which the data belongs. For example, if a logical block is divided in a number (t+1) of sectors, an logical address of a logical block to which a sector whose sector number is 100 belongs is determined by calculating 100/(t+1).

As having previously been described, there is predetermined a correspondence between segments of the flash memory 21 and logical blocks stored in physical blocks composing each of the segments. Therefore, when a logical address of a logical block to which a data to be written belongs is determined, it is known in which of the segments of the flash memory 21 the data is stored.

Next at STEP 12, the controller 25 generates in an internal memory thereof a table showing a correspondence between the physical addresses of the physical blocks composing the segment to which the data is to be written and the logical addresses of the logical blocks stored in the physical blocks, as shown in FIG. 6. At this time, if such a table has been generated for any other segment in the internal memory, the controller 25 will rewrite the existent table to a one for the segment to which the data is to be written.

Then at STEP 13, the controller 25 refers to the table thus generated to seek an unused one of the logical blocks composing the segment.

Further at STEP 14, the controller 25 reads from the register 23 the data to be written to the flash memory 21, and writes it to the unused physical block.

Next at STEP 15, the controller 25 rewrites the table to change the statement as to the logical address corresponding to the physical block in which the data has thus been written from "unused" to the logical address of the logical block to which the data having been written belongs.

Data Update

Updating of data written in the flash memory 21 of the memory card 20 in the data processing system 1 as will be described by way of example herebelow:

To update data written in the flash memory 21, first a read command is transmitted from the data processing circuit 11 of the data processing apparatus 10 to the controller 25 in the memory card 20 via the serial interface circuit 12 and S/P & P/S interface circuit 22.

Based on the read command, the controller 25 of the memory card 20 follows the procedure specified by the flow chart in FIG. 5 to read a desired data from the flash memory 21.

The data read from the flash memory 21 is written to the register 23 under the control of the controller 25. If the data thus written in the register 23 involves any error, it is subjected to error correction in the ECC circuit 24 connected to the register 23 based on the error correction code.

The data having the error thus corrected is transmitted to the data processing circuit 11 in the data processing apparatus 10 via the S/P & P/S interface circuit 22 and serial interface circuit 12. In the data processing circuit 11, the data is updated. The data updating is done in blocks. All logical blocks to which a date to update belongs are rewritten.

The data thus updated in the data processing circuit 11 is transmitted along with a write command to the memory card 20 via the serial interface circuit 12 and S/P & P/S interface circuit 22.

Based on the write command transmitted from the data processing apparatus 10, the controller 25 of the memory card 20 follows the procedure specified in the flow chart in FIG. 7 to write the updated data to the flash memory 21. Namely, the updated data will be written to an unused one of the physical blocks forming a segment to which the data is to be written.

Figure 8:
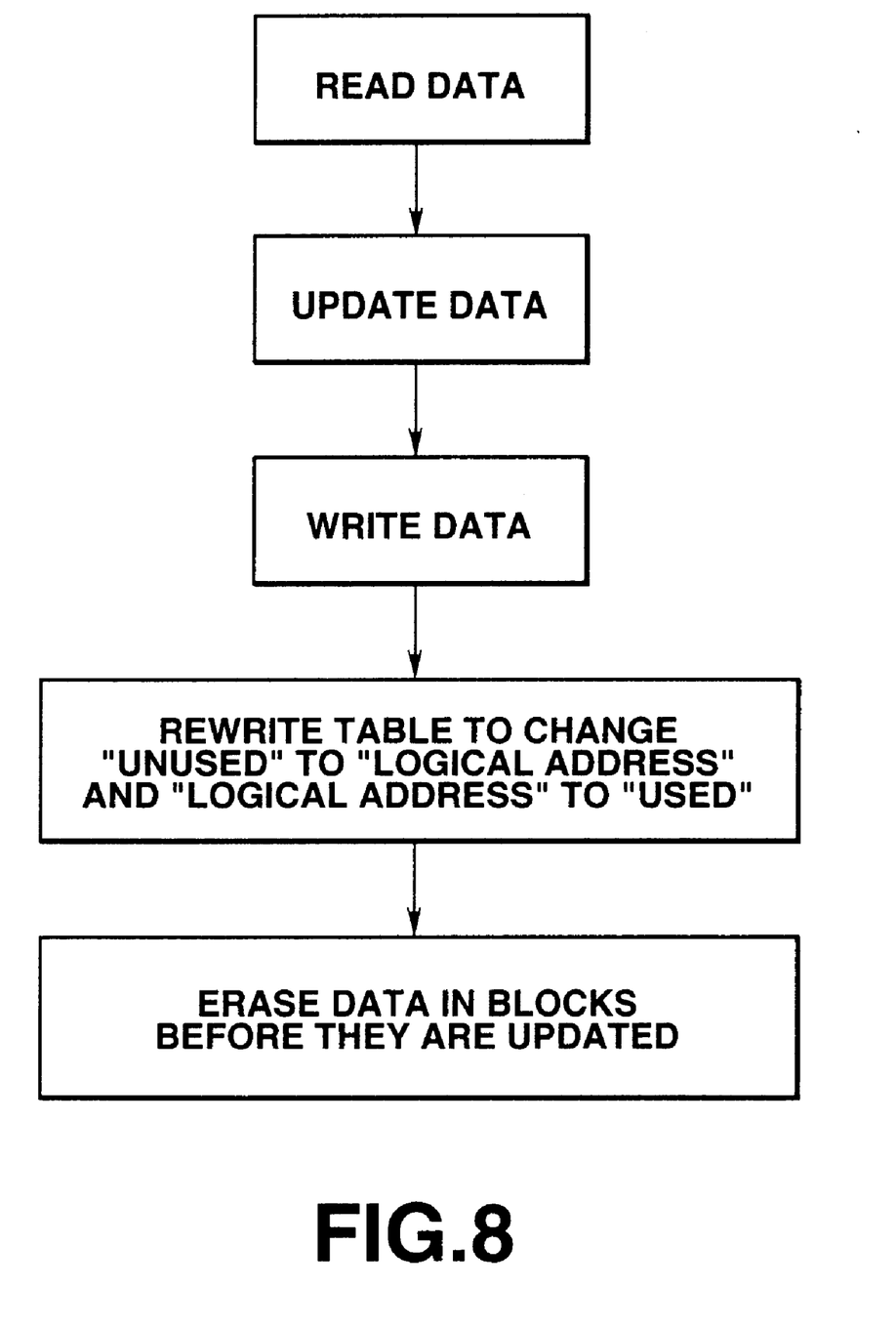
FIG. 8 is a flow chart of the operations in an example of updating of data written in the flash memory.

As shown in FIG. 8, after the updated data is written to the unused physical block, the controller 25 in the memory card 20 rewrites the table generated in the internal memory thereof to change the statement as to a logical address corresponding to a physical block to which the updated data has been written from "unused" to a logical address of a logical block to which the updated data belongs, and the statement as to a logical address corresponding to a physical block to which the updated data has been written before being updated from a logical address of the logical block to which the updated data belongs to "used".

Finally, the controller 25 erases the data in blocks before they are updated. Namely, the controller 25 refers to the table in the internal memory thereof to erase data in the logical block for which "used" is stated in the table.

Miscellaneous

In the foregoing, data read from and data write to the flash memory both under the control of the controller 25 in the memory card 20, have been described by way of example. It should be noted however that these data read and write may be done under the control of the controller 14 in the data processing apparatus 10. In this case, a table indicating a correspondence between physical addresses of physical blocks and logical addresses of logical blocks stored in the physical block, is generated in segments in the internal memory in the controller 14 of the data processing apparatus 10.

In the data processing system 1 according to the present invention, to read or write data from or to the flash card 21 of the memory card 20, a table indicating a correspondence between physical addresses of physical blocks composing the storage area of the flash memory 21 and logical addresses of logical blocks written in the physical blocks, is generated in segments of the flash memory 21 as mentioned above. Therefore, even when the flash memory 21 is designed to have an enlarged capacity for an increased number of physical blocks, the internal memory of the controller 25 in the memory card 20 or that of the controller 14 in the data processing apparatus 10 may have only a capacity large enough for generation of such a table in segments of the flash memory 21.

Thus, the present invention can provide the data processing system 1 having a larger capacity memory card 20 without any increase in cost due to an enlarged capacity of the internal memory of the controller 25 in the memory card 20 or that of the controller 14 in the data processing apparatus 10.

In the memory card 20 according to the present invention, when data is read from or written to the flash memory 21, a table indicating a correspondence between physical addresses of physical blocks forming the storage area of the flash memory 21 and logical addresses of logical blocks written in the physical blocks, is generated in segments of the flash memory 21. Therefore, even when the flash memory 21 is designed to have an enlarged capacity for an increased number of physical blocks, the internal memory of the controller 25 in the memory card 20 may have only a capacity large enough for generation of such a table in segments of the flash memory 21. Thus, the present invention can provide the memory card 20 having a larger storage capacity without any increase in cost due to an enlarged capacity of the internal memory of the controller 25 in the memory card 20.

The data storage according to the present invention is adapted such that when data is read from or written to the storage means thereof, a table indicating a correspondence between logical addresses of data written in a plurality of logical blocks composing a segment and physical addresses of physical blocks composing the segment, is generated in segments. Therefore, even if the capacity of the storage means is enlarged for an increased number of blocks, the capacity of the internal memory may be as required to generate a table in segments.

Therefore, the present invention provides a data storage having a large storage capacity without any increase in cost due to an enlargement in capacity of the internal memory.

The data processing system according to the present invention adopting the data storage adapted such that when data is read from or written to the storage means thereof, a table indicating a correspondence between logical addresses of data written in a plurality of logical blocks composing a segment and physical addresses of physical blocks composing the segment, is generated in segments. Therefore, even if the capacity of the storage means is enlarged for an increased number of blocks, the capacity of the internal memory may be as necessary to generate a table in segments.

Therefore, the present invention can provide a data processing system capable of processing a huge amount of data without any increase in cost due to an enlargement in capacity of the internal memory.

Also the data processing method according to the present invention uses the data storage adapted such that when data is read from or written to the storage means thereof, a table indicating a correspondence between logical addresses of data written in a plurality of logical blocks composing a segment and physical addresses of physical blocks composing the segment, is generated in segments. Therefore, even if the capacity of the storage means is enlarged for an increased number of blocks, the capacity of the internal memory may be as necessary to generate a table in segments.

Therefore, the present invention provides a data processing method adapted to process a huge amount of data without any increase in cost due to an enlargement in capacity of the internal memory.

What is claimed is:

1. A data storage for connection to an external device, comprising:

a storage means whose storage area is divided into a plurality of segments each consisting of a plurality of physical blocks each having an absolute address peculiar thereto; and a control means for writing or reading data to or from the storage means based on a command from said external device, wherein said control means determines a logical address of a logical block for the data to be written or read based on a predetermined sector number of the data, and wherein said control means generates in an internal memory thereof a table for the segment in said plurality of segments that includes the determined logical address for the logical block for the data to be written or read, said generated table mapping a correspondence between the absolute address of physical blocks in said segment and the corresponding logical address of those physical blocks, and wherein said control means determines from said generated table the absolute address of the physical block corresponding to said logical block for the data to be written or read, and wherein said control means writes over an existing table in said internal memory with said generated table if said existing table does not correspond to the segment that includes said logical block for the data to be written or read, and wherein the conversion table is generated for each segment that includes a determined logical address of a logical block for data to be written or read.

2. The data storage as set forth in claim 1, wherein said control means generates said table each time a command from said external device is performed.

3. The data storage as set forth in claim 1, wherein each logical address is stored in the physical block in said storage means.

4. The data storage as set forth in claim 1, wherein a logical address included in a range is converted to an absolute address within the segment decided beforehand.

5. The data storage as set forth in claim 1, further comprising:

an interface means for converting a serial data supplied from the external device to a parallel data while converting a parallel data internally developed to a serial data, and supplying it to said external device.

6. A data processing system, comprising:

a data storage comprising a storage means whose storage area is divided into a plurality of segments each consisting of a plurality of physical blocks each having an absolute address peculiar thereto; and a data processing apparatus connected to the data storage, the data processing apparatus comprising:

a control means for issuing a command to the storage means to write or read data, wherein said control means determines a logical address of a logical block for the data to be written or read based on a predetermined sector number of the data, and wherein said control means generates in an internal memory thereof a table for the segment in said plurality of segments that includes the determined logical address for the logical block for the data to be written or read, said generated table mapping a correspondence between the absolute address of physical blocks in said segment and the corresponding logical address of the physical blocks, and wherein said control means determines from said generated table the absolute address of the physical block corresponding to said logical block for the data to be written or read, and wherein said control means writes over an existing table in said internal memory with said generated table if said existing table does not correspond to the segment that includes said logical block for the data to be written or read, and wherein the conversion table is generated for each segment that includes a determined logical address of a logical block for data to be written or read.

7. The data processing system as set forth in claim 6, wherein the control means generates the table each time data is written to or read from the storage means.

8. The data processing system as set forth in claim 6, wherein each logical address is stored in the physical block in said storage means.

9. The data processing system as set forth in claim 6, wherein a logical address included in a range is converted to an absolute address within the segment decided beforehand.

10. The data processing system as set forth in claim 6, wherein the data processing apparatus further comprises:

an interface means for converting a parallel data internally developed to a serial data, and supplying it to an external device.

11. A data processing method of writing or reading data to or from a storage means whose storage area is divided into a plurality of segments each consisting of a plurality of physical blocks each having an absolute address peculiar thereto, the method comprising:

determining a logical address of a logical block for the data to be written or read based on a predetermined sector number of the data;

generating in an internal memory a table for the segment in said plurality of segments that includes the determined logical address for the logical block for the data to be written or read, said generated table mapping a correspondence between the absolute address of physical blocks in said segment and the corresponding logical address of those physical blocks;

writing said generated table over an existing table in said internal memory if said existing table does not correspond to the segment that includes said logical block for the data to be written or read; and referring to said generated table to write or read the data, wherein said table is generated for each segment that includes a determined logical address of a logical block for data to be written or read.

12. The method as set forth in claim 11, wherein each logical address is stored in the corresponding physical block of the storage means.

13. The method as set forth in claim 11, wherein a logical address included in a range is converted to an absolute address within the segment beforehand.

14. A data processing apparatus connected to a data storage comprising a storage means whose storage area is divided into a plurality of segments each consisting of a plurality of physical blocks each having an absolute address peculiar thereto, the data processing apparatus comprising:

a control means for issuing a command to storage means to write or read data; wherein said control means determines a logical address of a logical block for the data to be written or read based on a predetermined sector number of the data, and wherein said control means generates in an internal memory thereof a table for the segment in said plurality of segments that includes the determined logical address for the logical block for the data to be written or read, said generated table mapping a correspondence between the absolute address of physical blocks in said segment and the corresponding logical address of those physical blocks, and wherein said control means determines from said generated table the absolute address of the physical block corresponding to said logical block for the data to be written or read, and wherein said control means writes over an existing table in said internal memory with said generated table if said existing table does not correspond to the segment that includes said logical block for the data to be written or read, and wherein.

the conversion table is generated for each segment that includes a determined logical address of a logical block for data to be written or read.

15. The data processing apparatus as set forth in claim 14, wherein the control means generates the table each time data is written to or read from the storage means.

16. The data processing apparatus as set forth in claim 14, wherein a logical address included in a range is converted to an absolute address within the segment decided beforehand.

17. The data processing apparatus as set forth in claim 14, wherein the data processing apparatus further comprises:
   an interface means for converting a parallel data internally developed to a serial data, and supplying it to an external device.

18. A data storage for connection to an external device, comprising:
   a storage means whose storage area is divided into a plurality of segments each consisting of a plurality of physical blocks; and
   a control means for writing or reading data to or from the storage means based on a command from the external device, wherein
   said control means determines a logical address of a logical block for the data to be written or read based on a predetermined sector number of the data, and wherein
   said control means generates in an internal memory thereof a table for the segment in said plurality of segments that includes the determined logical address for the logical block for the data to be written or read, said generated table mapping a correspondence between the absolute address of physical blocks in said segment and the corresponding logical address of those physical blocks, and wherein
   said control means determines from said generated table the absolute address of the physical block corresponding to said logical block to which said command from said external device is directed to, and wherein
   said control means writes over an existing table in said internal memory with said generated table if said existing table does not correspond to the segment that includes said logical block for the data to be written or read, and wherein
   the conversion table is generated for each segment that includes a determined logical address of a logical block for data to be written or read.

19. The data storage as set forth in claim 18, wherein the control means generates the table each time a command from the external device is performed.

20. The data storage as set forth in claim 18, wherein each logical address is stored in the corresponding block of the storage means.

21. The data storage as set forth in claim 18, wherein a logical address included in a range is converted to an absolute address within the segment decided beforehand.

22. The data storage as set forth in claim 18, further comprising:
   an interface means for converting a serial data supplied from the external device to a parallel data while converting a parallel data internally developed to a serial data and supplying it to the external device.

23. A data processing system, comprising:
   a data storage comprising a storage means whose storage area is divided into a plurality of segments each consisting of a plurality of physical blocks; and
   a data processing apparatus having a control means for writing or reading data to or from the storage means, wherein
   said control means determines a logical address of a logical block for the data to be written or read based on a predetermined sector number of the data, and wherein
   said control means generates in an internal memory thereof a table for the segment in said plurality of segments that includes the determined logical address for the logical block for the data to be written or read, said generated table mapping a correspondence between the absolute address of physical blocks in said segment and the corresponding logical address of those physical blocks, and wherein
   said control means determines from said generated table the absolute address of the physical block corresponding to said logical block for the data to be written or read, and wherein
   said control means writes over an existing table in said internal memory with said generated table if said existing table does not correspond to the segment that includes said logical block for the data to be written or read, and wherein
   the conversion table is generated for each segment that includes a determined logical address of a logical block for data to be written or read.

24. The data processing system as set forth in claim 23, wherein the control means generates the table each time data is written to or read from the storage means.

25. The data processing system as set forth in claim 23, wherein each relative address is stored in the corresponding block of the storage means.

26. The data processing system as set forth in claim 23, wherein a logical address included in a range is converted to an absolute address within the segment decided beforehand.

27. The data processing system as set forth in claim 23, wherein the data processing apparatus further comprises:
   an interface means for converting a parallel data internally developed to a serial data, and supplying it to an external device.

28. A data processing method of writing or reading data to or from a storage means whose storage area is divided into a plurality of segments each consisting of a plurality of physical blocks, the method comprising:
   determining a logical address of a logical block for the data to be written or read based on a predetermined sector number of the data;
   generating in an internal memory a table for the segment in said plurality of segments that includes the determined logical address for the logical block for the data to be written or read, said generated table mapping a correspondence between the absolute address of physical blocks in said segment and the corresponding logical address of those physical blocks;
   writing said generated table over an existing table in said internal memory if said existing table does not correspond to the segment that includes said logical block for the data to be written or read; and
   referring to said generated table to write or read the data, wherein
   said table is generated for each segment that includes a determined logical address of a logical block for data to be written or read.

29. The method as set forth in claim 28, wherein each logical address is stored in the corresponding physical block of the storage means.

30. The method as set forth in claim 28, wherein a logical address included in a range is converted to an absolute address within the segment beforehand.

31. A data processing apparatus connected to a data storage comprising a storage means whose storage area is divided into a plurality of segments each consisting of a plurality of blocks, the data processing apparatus comprising:

a control means for issuing a command to said storage means to write or read data, wherein said control means determines a logical address of a logical block for the data to be written or read based on a predetermined sector number of the data, and wherein said control means generates in an internal memory thereof a table for the segment in said plurality of segments that includes the determined logical address for the logical block for the data to be written or read, said generated table mapping a correspondence between the absolute address of physical blocks in said segment and the corresponding logical address of those physical blocks, and wherein said control means determines from said generated table the absolute address of the physical block corresponding to said logical block for the data to be written or read, and wherein said control means writes over an existing table in said internal memory with said generated table if said existing table does not correspond to the segment that includes said logical block for the data to be written or read, and wherein the conversion table is generated for each segment that includes a determined logical address of a logical block for data to be written or read.

32. The data processing apparatus as set forth in claim 31, wherein the control means generates the table each time data is written to or read from the storage means.

33. The data processing apparatus as set forth in claim 31, wherein a logical address included in a range is converted to an absolute address within the segment decided beforehand.

34. The data processing apparatus as set forth in claim 31, wherein the data processing apparatus further comprises:

an interface means for converting a parallel data internally developed to a serial data, and supplying it to an external device.

* * * * *